March 7, 1944.  L. J. PAGE  2,343,574

SEMIRIMLESS SPECTACLE

Filed Aug. 30, 1940

Inventor.

Louis John Page

Patented Mar. 7, 1944

2,343,574

UNITED STATES PATENT OFFICE 2,343,574

SEMIRIMLESS SPECTACLE

Louis John Page, Hollis, N. Y., assignor to Olive Page, Hollis, N. Y.

Application August 30, 1940, Serial No. 354,800

6 Claims. (Cl. 88—41)

This invention relates to an improvement in securing ophthalmic lenses to a spectacle mounting. The improvement resides in the novel means of securing the lenses to the mounting.

One of the objects of my invention is to facilitate the mounting of lenses.

Another object is to provide a strap shoulder which creates pressure along the whole length of contact with the lens.

Another object of my invention is to use the temple support arm as a check to lens wobble.

Another object of my invention is to create a better looking, stronger, and cheaper to manufacture spectacle mounting.

These and other objects and advantages reside in the combination of such novel features of construction which will be more fully described and explained in the appended claims.

Referring to the drawing.

Figure 1:
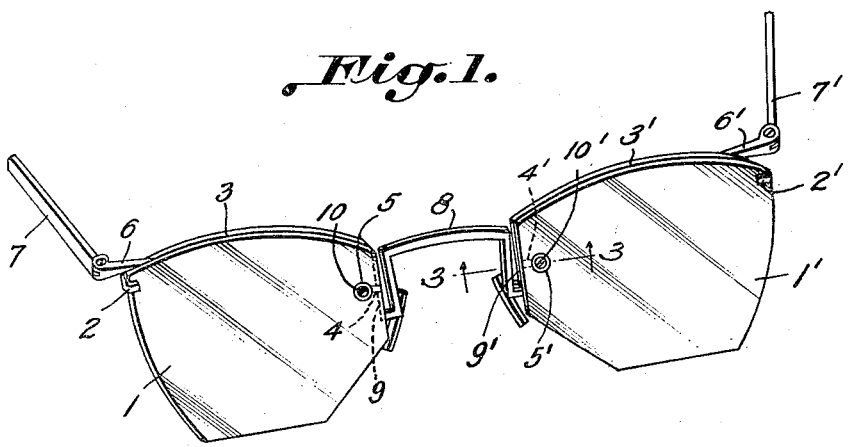
Figure 1 is a perspective view of a pair of spectacles embodying my invention.

Referring to Figure 1 the bridge 8 supports two members 9 and 9' which are parts of the arms 3 and 3'. The arms 3 and 3' terminate in loops 2 and 2' forming clamps. To the members 9 and 9' are attached strap ears 4 and 4'. A pair of lenses 1 and 1' are secured in position by the screws 10 and 10' which pass through washers 5 and 5' positioned on the front surface over holes in the lenses 1 and 1'. The screws 10 and 10', after passing through the washers and the holes in the lenses, are threaded into the strap ears 4 and 4'. The loops 2 and 2' fit into notches formed in the temporal edges of lenses 1 and 1'. To the rear side near the temporal end of the arms 3 and 3' are attached endpieces 6 and 6' which in turn support the temples 7 and 7'.

Figure 2:
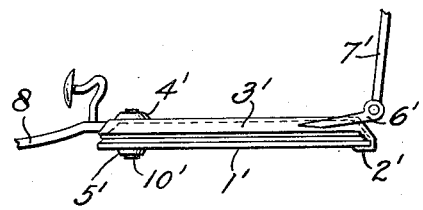
Figure 2 is a top fragmentary view of the mounting shown in Figure 1.

Referring to Figure 2 the arm 3' is shown in relation to the long bevel ground on the edge of the lens 1'. The loop 2' fits into a notch formed in the temporal edge of the lens 1'. The lens 1' is attached to the arm 3 by means of the strap ear 4'. The lens 1' is secured to the strap ear 4' by means of the screw 10' and the washer 5'. An endpiece 6' is attached to the temporal side of the arm 3'. A temple 7' is pivotally attached to the endpiece 6'.

Figure 3:
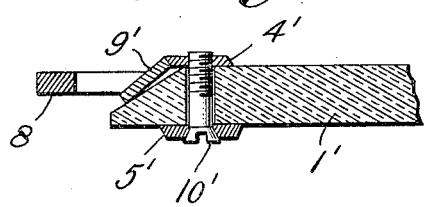
Figure 3 is a cross sectional view on the line 3—3 in Figure 1.

Referring to Figure 3 the lens 1' is shown in position in relation to the member 9' and strap ear 4'. The inner angle of member 9' and strap ear 4' is smaller when the mounting is not attached to the lens. When the screw 10' is threaded into the strap ear 4' it pulls the strap ear 4' against the rear surface of the lens 1' so that the member 9' exerts pressure along the bevel of the lens 1'. The upright part of the bridge is shown as 8.

In mounting lenses, the loop 2 is positioned in a notch formed in the temporal edge of the lens. The strap ear is then positioned over a hole drilled near the nasal edge of the lens. In positioning the strap ear it is necessary to put some tension on the arm 3 since the distance between the loop 2 and the strap ear 4 is shorter before mounting than after mounting. A screw is inserted through a washer, through the hole in the lens and threaded into the strap ear. Upon screwing the strap ear against the rear surface of the lens, the arm 3 engages a bevel formed along that part of the lens.

It is apparent that many changes could be made, such as, the bridge may have various designs and may be attached to the lens in the most suitable manner; different types of straps may be combined with the arms; the straps may be attached at several positions; the arms may have various shapes and bends; the endpieces may be attached at different points. Therefore it is intended that the matter contained in the above specification is not limiting.

I claim:

1. An ophthalmic mounting comprising a bridge, arms, said arms being attached to said bridge, said arms being directed in opposite directions and terminating in a forward projecting part forming a clamp, endpieces, said endpieces being attached near the outer end on the rear side of said arms, temples, said temples pivotally mounted to said endpieces, strap ears, said strap ears being attached to the inner side of said arms opposite to said bridge, the plane of said strap ear forming an obtuse angle with the plane of the surface of the adjacent arm part, said strap ear having a threaded hole, lenses, said lenses being prepared with a long inner bevel, a hole and a notch, said clamp positioned in said notch, said strap ear positioned over said hole, washers, each of said washers positioned over said hole on the opposite surface of said lens, screws, said screws inserted through said washers and lens holes and screwed into said strap ears, the edge of said arm part adjacent said strap ear pressing against the lens bevel, securing said lenses in position in said mounting.

2. An ophthalmic mounting, comprising, in combination with a pair of prepared lenses, said lenses being provided with a perforation at the nasal side, a notch at the temporal side and an inner bevel, a bridge, arms having an inclined surface overlying the lens bevel, each of said arms being attached to said bridge, being directed substantially to follow the top of the inner bevel of said lens, said arm terminating at the temporal end of said lens in a forward projecting clamp, strap ears, said strap ears being attached to said arms opposite to said bridge, the angle between the inclined surface of the arm and the strap ear being such that the arm presses against the inner bevel of the lens upon screwing the strap ear against the rear surface of the lens, said clamp being held in the notch of said lens by the spring action of said arms, temples and endpieces, said temples and endpieces being attached to the temporal end part of said arms, screws and washers, said lenses being secured to said strap ears by means of said screws and washers.

3. An ophthalmic mounting, comprising, in combination with a pair of prepared lenses, said lenses being provided with a perforation at the nasal side, a notch at the temporal side and an inner bevel, a bridge, arms having an inclined surface overlying the lens bevel, said arms being attached to said bridge and being directed to follow the upper edge of the inner bevel of said lens, said arms terminating at the temporal side of said lenses in a clamp, strap ears, each of said strap ears being attached to said arms opposite to said bridge, the angle between the inclined surface of the arm and the strap ear being such that the arm presses against the outer part of the inner bevel of the lens upon screwing the strap ear against the rear surface of the lens, each of said lenses being secured to one of said arms by the clamp being positioned in the notch in said lens, said strap ear being positioned over the hole in said lens by exerting tension on said arm, screws and washers, each of said screws passing thru the washer and the hole in said lens and screwed into said strap ear, temples and endpieces, said temples and endpieces being attached to the temporal ends of said arms.

4. An ophthalmic mounting, comprising, in combination with a pair of prepared lenses, said lenses being provided with a perforation at the nasal side and an inner bevel, a bridge, arcuate arms, temples and endpieces, said temples and endpieces being attached to said arcuate arms, strap ears, said strap ears being attached to the rear edge of said arcuate arms, the angle between the surface of the arcuate arm and the strap ear being such that the arcuate arm presses against the inner bevel of the lens upon screwing the strap ear against the rear surface of the lens, said strap ears having a flexing action with respect to said arcuate arms, screws and washers, said screws and washers securing said lenses to said strap ears.

5. In combination, an ophthalmic mounting, lenses, each of said lenses being provided with a perforation at the nasal side, a notch at the temporal side and an inner bevel, said mounting comprising a bridge, arcuate arms, said arcuate arms being attached to opposite sides of said bridge and terminating at the temporal side in a forward projection, endpieces, said endpieces being attached to the temporal side of said arcuate arms, temples, said temples being pivotally mounted to said endpieces, strap ears, said strap ears being attached to the inner side at the nasal part of said arcuate arms, screws and washers, said screws being inserted through said washers and lens perforations and threaded into said strap ears, said arcuate arms being directed to follow the upper part of the inner bevel of said lenses, so that said forward projection at the end of said arcuate arm can be snapped into the notch of said lens, said arcuate arms and said forward projections forming tension clamps securing said lenses in place relative to said mounting.

6. In combination, an ophthalmic mounting, lenses, each of said lenses being provided with a perforation at the nasal side and an inner bevel, said mounting comprising a bridge, arcuate arms, said arcuate arms being attached to opposite sides of said bridge, temples and endpieces, said temples and endpieces being attached to the temporal ends of said arcuate arms, strap ears, said strap ears being attached to the nasal side of said arcuate arms, opposite to said bridge, the angle between the arcuate arm and the strap ear being such that the arcuate arm presses against the inner bevel of said lens upon screwing the strap ear against the rear surface of the lens, screws and washers, said screws being inserted through said washers and the perforations in said lenses and threaded into said strap ears, for purposes set forth.

LOUIS JOHN PAGE.